Patented Dec. 28, 1926.

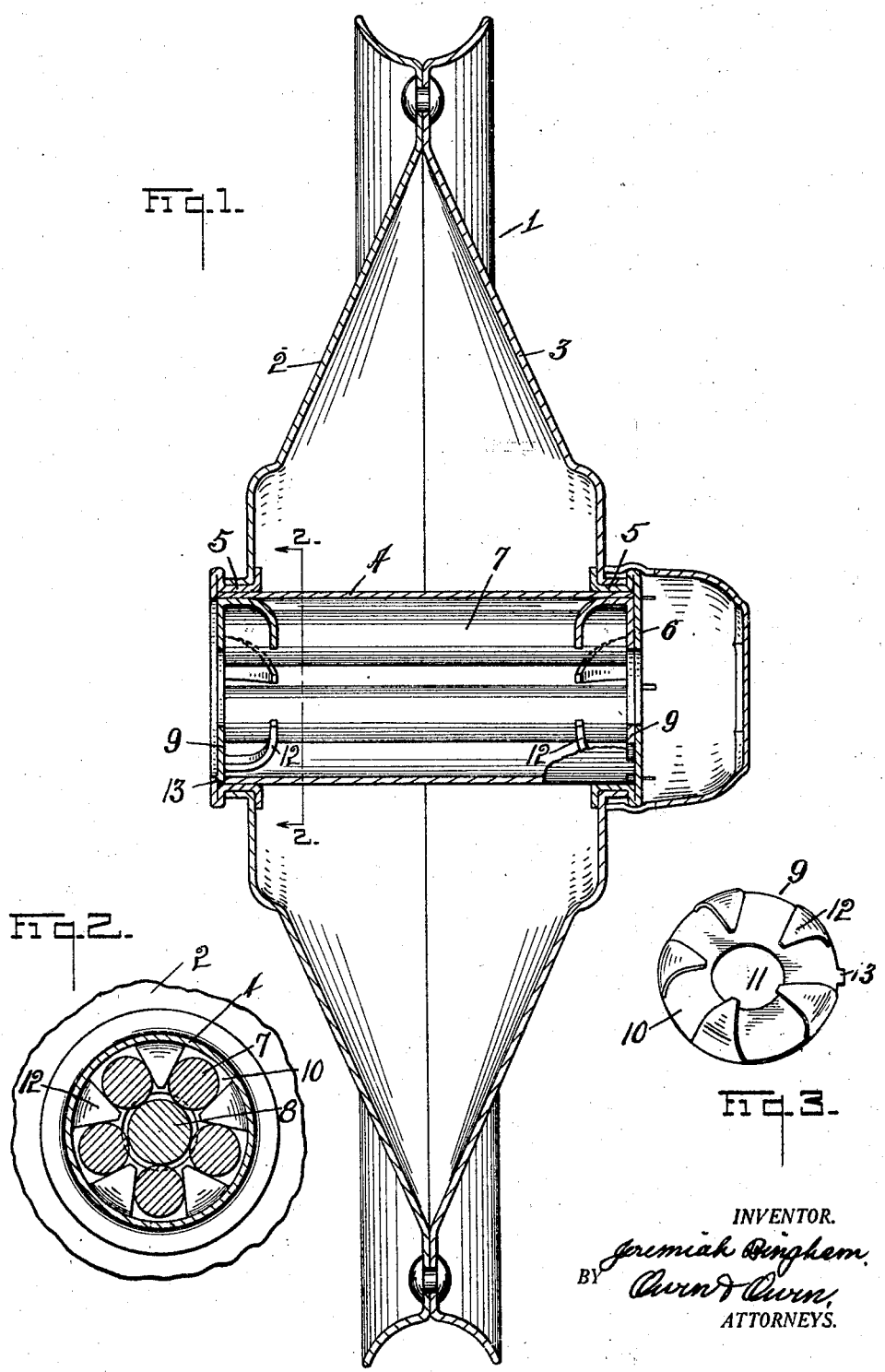

1,612,170

UNITED STATES PATENT OFFICE.

JEREMIAH BINGHAM, OF TOLEDO, OHIO, ASSIGNOR TO THE BINGHAM STAMPING & TOOL COMPANY, OF TOLEDO, OHIO, A CORPORATION OF OHIO.

WHEEL CONSTRUCTION.

Application filed November 16, 1925. Serial No. 69,315.

This invention relates to sheet metal wheels, rollers, pulleys or the like, and has for an object thereof the provision of broadened reinforced bearings in the hub ends for the customary hub sleeve or barrel. Another object of the invention is the provision of a novel and efficient cap retaining feature for the outer hub ends of wheels of this character.

The invention is fully described in the following specification, and while in its broader aspect it is capable of embodiment in numerous forms, one embodiment thereof is illustrated in the accompanying drawings, in which,—

Figure 1 is a central sectional view of a wheel or the like embodying the invention with the section longitudinal to the axis. Fig. 2 is a perspective view of the cup member forming a part of the invention before being inserted into a wheel disc, and Fig. 3 is a fragmentary section of the central portion of one of the wheel discs with the lining cup member for the disc opening in initial position therein.

Referring to the drawings, 1 designates what will hereinafter be referred to as a wheel, but which may be a pulley, roller or the like. This wheel is of the disc type and includes the two opposed inner and outer discs 2 and 3 of sheet metal. These discs, as is customary with wheels of this type, have their central portions outwardly pressed in cylindrical form to provide bearings for the respective ends of the usual hub barrel 4, said outwardly pressed portions, in the present instance, being in the form of outwardly turned annular flanges 5.

A cylindrical bearing member 6, in the present instance of cup form and having its open end provided with an outwardly projecting flange 7, is fitted into each bearing flange 5 of the wheel discs from the inner side thereof, being of suitable size for such purpose, and has its edge flange 7 in stop engagement with the adjacent inner side edge portion of the respective disc. When the member 6 is inserted into a bearing flange 5 with its flange 7 in stop engagement with the inner side of the associated disc, the outer end of the member 6 projects a sufficient distance beyond the free edge of the flange 5, so that when the sidewall portion thereof beyond the flange 5 is outwardly doubled by an inward compressing force on the outer end of the member, said doubled wall portion will form an annular radially projecting flange 8 at the outer end of the flange 5 in contact therewith and of a radial depth to project a distance beyond the outer circumference of said flange. The provision of the flange 8 is not only for the purpose of opposing the flange 7 in its engagement with the wheel disc flange 5, but is also for the purpose of providing a radially projecting portion of greater diameter than the flange 5, and in outwardly spaced relation to the body of the associated wheel disc, with which the open end of a hub cap 9 may be engaged. This cap, which is of the usual cup form, has its free edge split at intervals, as shown at 10, to provide an annular series of tongues around the cap edge for springing engagement over the flange 8. The cap 9 is preferably adapted to be forced a sufficient distance over the flange 8 for the inner cap edge to engage the disc 3, and the cap is yieldingly held in this position by the provision of an annular recess 11 which forms a seat for receiving the edge of the flange 8.

The outer end of the bearing member 6, which is inserted within the outer disc bearing of the wheel, is provided with a central opening 12 of a size to permit the insertion of the outer end portion of a hub axle therethrough while the member 6 at the inner side of the wheel is preferably provided with a central opening 13 of a size corresponding to the inner diameter of the barrel 4, so as to permit the assembling of an antifriction bearing unit 14 within the hub barrel. It is apparent that the openings 12 and 13 may be formed in the bearing members 6 either before or after they have been secured to the wheel discs, and that the annular flanges formed by the walls of said openings project within the cylindrical bearing portions of the members 6 to have opposing coaction with the ends of the barrel 4 to retain it in position within the wheel discs.

It is also apparent that the provision of the bearing member 6 within the disc openings not only reinforce the flanges 5 or bearing portions of the discs, but effect a prolongation of the bearings provided in the discs for the ends of the hub barrel 4, and that the outer bearing member 6 also provides an annular retaining ledge or flange at the outer end of the wheel hub with which an axle end enclosing cap may be frictionally engaged.

I wish it understood that my invention is not limited to any specific construction, arrangement or form of the parts, as it is capable of numerous modifications and changes without departing from the spirit of the claims

Having thus described my invention, what I claim as new and desire to secure by Letters Patent is:

1. A hub construction for disk wheels provided with a central opening comprising an annular member with outwardly extending flanges secured in the disk opening and having inner and outer engagement with the disk to retain it in position therein and forming at its outer end a hub cap holding portion, and a hub barrel mounted in said annular member.

2. A hub construction for disk wheels provided with a central opening, comprising a sleeve in said opening, outwardly extending flanges on said sleeve at the inner and outer ends of said opening to retain the sleeve rigidly in position, said outer flange being spaced from the outer side portion of the wheel and forming an anchorage for a hub cap, and a hub barrel disposed in said sleeve.

3. A hub construction for disk wheels having a pair of body disks provided with aligned hub barrel receiving openings, comprising a sleeve in each of said openings, outwardly extending flanges on said sleeve at the inner and outer ends of the openings to retain said sleeve rigidly in position, one flange being spaced from the adjacent outer side portion of the respective disk and forming an anchorage for a hub cap, and a hub barrel mounted at its ends in said sleeve, said sleeves having inwardly projecting portions for coacting with the respective barrel ends to prevent axial movement of the barrel in the sleeves.

4. A hub construction for disk wheels having opposed body disks, comprising outwardly extending flanges on the inner edges of the body disks forming hub barrel receiving openings, a sleeve disposed within each flange and anchored against axial movements therein, a radially projecting portion on one end of said sleeve extending beyond the adjacent flange, a hub cap having snap holding engagement over said projecting portion of the sleeve, and a hub barrel having its ends mounted in said sleeve, and being held against axial movement by the outer end portions of the sleeves.

5. A hub construction for disk wheels having opposed body disks provided with central hub openings and out-turned inner edge flanges around said openings comprising a sleeve fitted in each flange and having its inner end radially enlarged for shouldered stop engagement with the inner marginal wall of the opening and having its outer end portion doubled outwardly upon itself to provide a radial stop flange at the outer end of the first-mentioned flange to prevent inward movement of the sleeve relative thereto, the doubled portion of the outer sleeve forming a hub cap engaging portion in outwardly spaced relation to the adjacent disk body, and a hub barrel mounted at its ends in said sleeves and held against axial movement by the sleeves.

6. A hub construction for disk wheels having opposed body disks provided with hub openings, comprising a sleeve within each hub opening and anchored against axial movements therein, a hub barrel mounted at its ends in said sleeves and each sleeve having an inturned portion without the adjacent barrel end for engagement therewith to prevent axial movements of the barrel therein, and the outer sleeve having a radially projecting portion in outwardly spaced relation to the adjacent disk member, and a hub cup having a yielding mouth portion for receiving and having frictional holding engagement with said radially projecting sleeve portion.

In testimony whereof I have hereunto signed my name to this specification.

JEREMIAH BINGHAM.